(12) United States Patent
Agarwal

(10) Patent No.: US 11,349,986 B2
(45) Date of Patent: May 31, 2022

(54) CUSTOMIZATION OF CALL FORWARDING OR VOICEMAIL GREETINGS BASED ON LOCATION OF WIRELESS DEVICE

(71) Applicant: T-Mobile USA, Inc., Bellevue, WA (US)

(72) Inventor: Bikash Agarwal, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 11 days.

(21) Appl. No.: 17/081,954

(22) Filed: Oct. 27, 2020

(65) Prior Publication Data
US 2022/0131974 A1    Apr. 28, 2022

(51) Int. Cl.
| | |
|---|---|
| H04M 3/42 | (2006.01) |
| H04M 3/533 | (2006.01) |
| H04M 3/54 | (2006.01) |
| H04L 65/10 | (2022.01) |
| H04L 65/1073 | (2022.01) |
| H04L 65/1096 | (2022.01) |
| H04W 4/02 | (2018.01) |
| H04L 65/1063 | (2022.01) |
| H04L 65/1045 | (2022.01) |
| H04L 65/1016 | (2022.01) |

(52) U.S. Cl.
CPC .... *H04M 3/42348* (2013.01); *H04L 65/1006* (2013.01); *H04L 65/1063* (2013.01); *H04L 65/1073* (2013.01); *H04L 65/1096* (2013.01); *H04M 3/53383* (2013.01); *H04M 3/543* (2013.01); *H04W 4/02* (2013.01); *H04L 65/105* (2013.01); *H04L 65/1016* (2013.01)

(58) Field of Classification Search
CPC ......... H04M 3/42348; H04M 3/53383; H04M 3/543; H04L 65/1006; H04L 65/1073; H04L 65/1096; H04L 65/1063; H04L 65/105; H04L 65/1016; H04W 4/02
See application file for complete search history.

(56) References Cited

U.S. PATENT DOCUMENTS

| | | |
|---|---|---|
| 5,353,331 A | 10/1994 | Emery et al. |
| 5,621,783 A | 4/1997 | Lantto et al. |
| 5,806,000 A | 9/1998 | Vo et al. |
| 5,815,810 A | 9/1998 | Gallant et al. |
| 5,884,180 A | 3/1999 | Bertacchi |
| 5,901,359 A | 5/1999 | Malmstrom |
| 5,978,672 A | 11/1999 | Hartmaier et al. |
| 6,047,184 A | 4/2000 | Haces et al. |

(Continued)

*Primary Examiner* — Brenda H Pham
(74) *Attorney, Agent, or Firm* — Perkins Coie LLP

(57) ABSTRACT

A wireless telecommunications system provides location-specific call forwarding. The system can receive a request to connect a voice call to the wireless device, which can invoke a call forwarding procedure depending on a status of a subscriber associated with the wireless device. When the system determines that a current location of the wireless device is different from a default location, location-specific call forwarding information is used to forward the voice call to a terminating node associated with the location-specific forwarding information rather than a default terminating node for the default location. The terminating node can include a voicemail server that plays back a location-specific voicemail greeting to the caller.

20 Claims, 5 Drawing Sheets

(56) References Cited

U.S. PATENT DOCUMENTS

| | | |
|---|---|---|
| 7,570,617 B2 | 8/2009 | Kil et al. |
| 7,738,488 B2 | 6/2010 | Marsico et al. |
| 7,953,388 B2 | 5/2011 | Millen et al. |
| 8,060,101 B2 | 11/2011 | Long et al. |
| 8,498,385 B2 | 7/2013 | Theppasandra et al. |
| 8,908,665 B2 | 12/2014 | Alriksson |
| 2003/0003927 A1 | 1/2003 | Worsham et al. |
| 2003/0032428 A1 | 2/2003 | Zhu et al. |
| 2003/0083067 A1 | 5/2003 | Hanson |
| 2003/0130864 A1 | 7/2003 | Ho et al. |
| 2004/0180654 A1 | 9/2004 | Chen |
| 2004/0196810 A1 | 10/2004 | Kil et al. |
| 2004/0209615 A1 | 10/2004 | Lamb et al. |
| 2005/0096006 A1 | 5/2005 | Chen et al. |
| 2005/0130649 A1 | 6/2005 | Kirby |
| 2005/0186950 A1 | 8/2005 | Jiang |
| 2005/0186960 A1 | 8/2005 | Jiang |
| 2006/0002355 A1 | 1/2006 | Baek et al. |
| 2006/0023658 A1 | 2/2006 | Phillips et al. |
| 2007/0189469 A1* | 8/2007 | Croak ................ H04M 7/0075 379/45 |
| 2008/0305803 A1 | 12/2008 | Long et al. |
| 2012/0307813 A1 | 12/2012 | Alriksson |
| 2013/0059611 A1* | 3/2013 | Takechi ................ H04W 68/02 455/458 |
| 2017/0366954 A1 | 12/2017 | Sabeur et al. |

* cited by examiner

CUSTOMIZATION OF CALL FORWARDING OR VOICEMAIL GREETINGS BASED ON LOCATION OF WIRELESS DEVICE

BACKGROUND

Call forwarding, or call diversion, is a telephony feature which redirects a telephone call to another destination, which may be, for example, a mobile or another telephone number where the desired called party is available. Call forwarding typically can redirect incoming calls to any other domestic telephone number. For example, call forwarding is often enabled by dialing *72 and then entering a 10-digit phone number where a subscriber wants calls to be forwarded (e.g., *72-908-1234567).

Diverting calls can increase one's availability to a caller. An alternative includes using voicemail; however, a caller may not wish to leave a recorded voicemail message, suspecting that the called party will delay returning the message. A voicemail system for a wireless network is a computer-based system that allows users and subscribers to exchange personal voice messages; to select and deliver voice information; and to process transactions relating to individuals, organizations, products, and services, using a mobile phone. The term is also used more broadly to denote any system of conveying stored telecommunications voice messages, including using an answering machine. Most cell phone services offer voicemail as a basic feature; many corporate private branch exchanges include versatile internal voice-messaging services.

Voicemail systems are designed to convey a caller's recorded audio message to a recipient. The caller is usually prompted with a recorded voicemail greeting to leave the message for the recipient. The recipient can customize the voicemail greeting through a user interface, which also allows the recipient to select, play, and manage messages; a delivery method to either play or otherwise deliver the message; and a notification ability to inform the user of a waiting message. Most systems use phone networks, either cellular- or landline-based, as the conduit for all of these functions. Some systems may use multiple telecommunications methods, permitting recipients and callers to retrieve or leave messages through multiple methods such as PCs, PDA, cell phones, or smartphones.

BRIEF DESCRIPTION OF THE DRAWINGS

Embodiments of the present technology will be described and explained through the use of the accompanying drawings.

Figure 1:
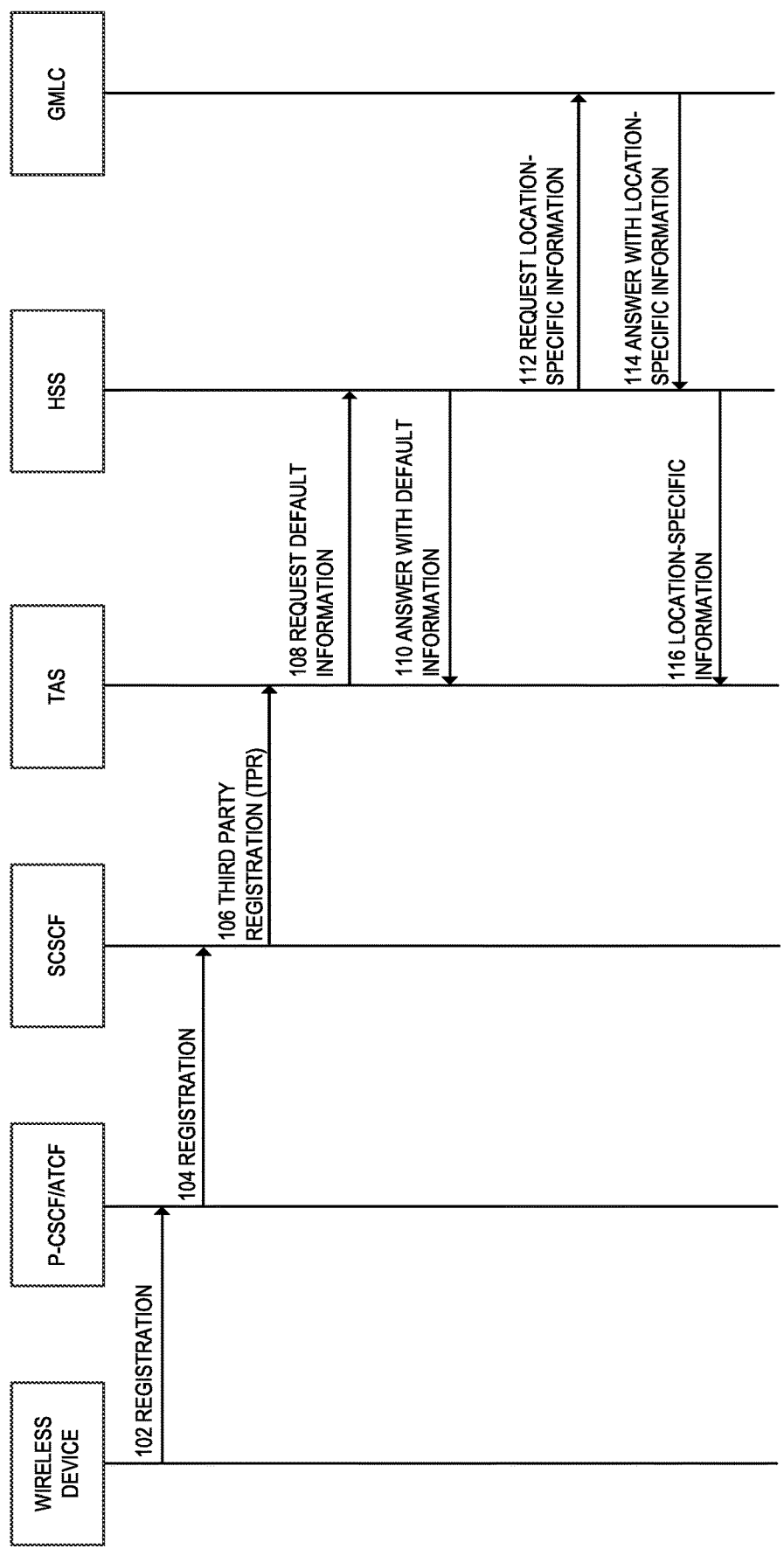
FIG. 1 is a flow diagram that illustrates a process for obtaining location-based information during an IP multimedia subsystem (IMS) registration process.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that location-specific embodiments may be employed without departing from the principles of the technologies. Accordingly, while specific embodiments are shown in the drawings, the technology is amenable to various modifications.

DETAILED DESCRIPTION

The disclosed technology relates to improved call forwarding procedures. An aspect of the technology includes call forwarding based on the geographic location ("location") of a subscriber's wireless device. A call forwarding procedure redirects a voice call to another destination, which can include a communications device or a voicemail server. Accordingly, another aspect of the disclosed technology relates to playback of location-specific voicemail greetings, which depend on the location of the subscriber's wireless device. As such, the technology broadly covers location-specific call forwarding procedures that use current location information of the wireless device.

The location information can be obtained through a process that is related to call forwarding procedures or can be obtained through a completely unrelated process. For example, the location information can be obtained from roaming or registration procedures and stored for subsequent use when receiving a voice call to determine how to handle call forwarding procedures. In one example, a subscriber's location is obtained from a p-Access Network Info (PANI) SIP header when the subscriber's wireless device registers (e.g., connects) with the telecommunications network.

In one implementation, the location information that is obtained during a registration process is used to decide whether a Telephony Application Server (TAS) should query a Home Subscriber Server (HSS) to perform a default call forwarding procedure or request alternate call forwarding information from a Gateway Mobile Location Centre (GMLC) node, when the subscriber is at a location other than a default location (e.g., home). The GMLC node can store a registry including rules and policies that identify subscribers mapped to location-specific call forwarding numbers and voicemail greetings.

A subscriber can customize the location-specific call forwarding information (including voicemail greetings) from a mobile app ("app") running on the wireless device. However, the processes that implement the location-specific call forwarding procedures operate on the network side, not solely at the device side. As such, for example, a subscriber can enable or disable these features by dialing a short code (e.g., *#<MSSDN>) because the feature operates on the network-side.

This technology improves over conventional call forwarding on a wireless telecommunications network, which is location independent. Specifically, in a conventional call forwarding procedure, the network retrieves a subscriber's forwarding number to forward all calls (regardless of the subscriber's location) to the same terminating node. Such a configuration burdens the subscriber to manually change a call forwarding number depending on the subscriber's current location, which is particularly problematic when the subscriber routinely changes between a handful of locations. Further still, the subscriber is burdened with changing the voicemail greeting depending on the subscriber's location or keep the same voicemail greeting despite a change in the subscriber's location. For example, a subscriber that works in multiple time zones would need to change the voicemail greeting to notify callers of the subscriber's availability or when to expect a return call. Thus, location-specific greetings can better inform callers to manage expectations. In another example, a location-specific voicemail greeting can activate when the user is "away" (e.g., from a home location) such that the caller is informed to understand that the subscriber is on vacation or will otherwise not return a phone call promptly.

An existing tool for customizing call forwarding features can include an app that manages certain functions locally at the wireless device. For example, an app can schedule call forwarding on/off for different times of a day or depending on a user's location. However, the app directly controls the wireless device, not the network side components to manage call forwarding procedures. These types of apps have limited call management functionality, are less reliable, less accurate, consume more local resources, and would require tracking a subscriber's location, which is undesirable due to privacy concerns. In contrast, the disclosed technology operates on the network side to conserve the resources of the wireless device, can operate despite a current status of the phone (e.g., on/off), and reuses location information that is already obtained by the network for connectivity or other purposes not related to call forwarding procedures.

The disclosed technology can be implemented in a variety of ways. The following description explains only some implementations for the sake of brevity. The technology can be implemented in wireless networks that support various technology standards (e.g., 5G, 4G) with call forwarding features. Additional techniques are described in assignee's related applications including U.S. patent application Ser. No. 16/416,027, filed May 17, 2019, titled "Techniques for retrieving a voicemail pilot number from a telecommunications network node," which is incorporated by reference in its entirety for all purposes.

For example, Voice over Long-Term Evolution (VoLTE) is a standard for high-speed wireless communication for wireless devices such as user equipment (UE). VoLTE is based on the IP Multimedia Subsystem (IMS) network with specific profiles for control and media planes of voice services. Voice service is delivered as data flows within the LTE data bearer, which provides greater voice and data capacity compared to prior generation technologies and frees up bandwidth because VoLTE packet headers are smaller than those of unoptimized VoIP/LTE.

During a VoLTE call, an originating caller seeks to establish a voice call with a terminating node (e.g., a wireless device of a subscriber). The terminating node can be set to forward all voice calls to another terminating node or not answer voice calls at all. If so, a Telephony Application Server (TAS) can initiate a call forwarding procedure. Examples of call forwarding procedures include call forward not reachable (CFNR), call forwarding unconditional (CFU), and call forwarding busy (CFB). A call forwarding procedure can use a subscriber's profile information to retrieve a call forwarding number (e.g., voicemail pilot number ("pilot number")) from a network node (e.g., a voicemail server) and/or a voicemail greeting. An example of a pilot number is an SS7 number that designates a directory number to deposit a voicemail message for a subscriber.

The TAS is a node in a telecommunications network that generally carries out functions that are not directly related to routing of voice calls through the network. Such functions include in-network answering machines, automatic call forwarding, conference bridges and many other types of applications. Thus, the TAS maintains subscriber profile information but not call routing instructions. The TAS can also deposit (or retrieve) voicemail messages and cause playback of voicemail greetings by sending a query to a voicemail server to obtain the subscriber's pilot number. The pilot number is used with routing instructions to deposit a voicemail message at a voicemail server. Therefore, every time that a caller deposits a voicemail message, the TAS normally issues a query to obtain the pilot number from the voicemail server. Likewise, the TAS can obtain a call forwarding number every time the status of a subscriber is set to call forwarding.

The disclosed technology improves over prior call forwarding procedures because the location information of a wireless device, which is obtained during routine processes, can be used to perform a location-specific call forwarding procedure. FIG. 1 is a flow diagram that illustrates an example of a process 100 for obtaining location information during an IMS registration procedure. At 102, a wireless device sends a registration message to a proxy-call session control function (P-CSCF)/access transfer control function (ATCF). The message can inform a SIP server of a location, which can be obtained from a p-Access Network Info (PANI) SIP header. At 104, a P-CSCF/ATCF sends the registration message to a serving call session control function (SCSCF). At 106, the SCSCF sends a third-party registration (TPR) message to the TAS. The purpose of the TPR message is to let the TAS know that the wireless device is now connected and ready to communicate. At 108, in response to the TPR message, the TAS sends a request to a home subscriber server (HSS) for a forwarding number (e.g., voicemail pilot number) of a terminating node that can, for example, playback a voicemail greeting. Normally, the HSS is the main IMS database that concatenates a home location register (HLR) and an authentication center (AuC).

The TAS can request call forwarding information during registration. At 110, the HSS responds with the requested call forwarding information (e.g., including a call forwarding number). The TAS can save the retrieved call forwarding information with the subscriber's profile along with other information about subscriber capabilities. As such, registration is complete, and the network session ends. The obtained call forwarding number may then be used to update the subscriber profile information maintained at the TAS. The registration process could also occur during a periodic refresh process. For example, a telecommunication network can periodically cause a wireless device to re-register (e.g., every 30 minutes). As such, the TAS can be periodically updated with subscriber information, which could capture any change to the call forwarding number that depends on the current location of the subscriber's wireless device.

The disclosed technology can further improve over conventional call forwarding procedures by accessing location-specific call forwarding information stored at a network node. For example, when the TAS detects the current location of a wireless device as different from a default location, the TAS can request location-specific call forwarding information obtained from the GMLC instead of using default call forwarding information of the HSS.

A GMLC offers functionality that supports a location-based service (LBS). In one public land mobile network (PLMN), there may be more than one GMLC. The GMLC is the first node an external LBS client accesses in, for example, an LTE network. The GMLC may request routing information from the HLR or HSS. After performing registration authorization, it sends positioning requests to either a visited mobile switching centre (VMSC), SGSN serving GPRS support node (SGSN) or mobile switching centre (MSC) server and receives final location estimates.

For example, at 112, the HSS can request location-specific call forwarding information from the GMLC before a call forwarding procedure is invoked (e.g., during registration) or in response to invoking a call forwarding procedure. At 114, the GMLC responds to the request with location-specific call forwarding information (e.g., a location-specific call forwarding number) based on the current location of the wireless device. At 116, the TAS receives the location-specific call forwarding information from the HSS and can save it locally in the subscriber's profile. As such, the location-specific call forwarding information is used to update the subscriber's profile information maintained and used by the TAS.

Figure 2:
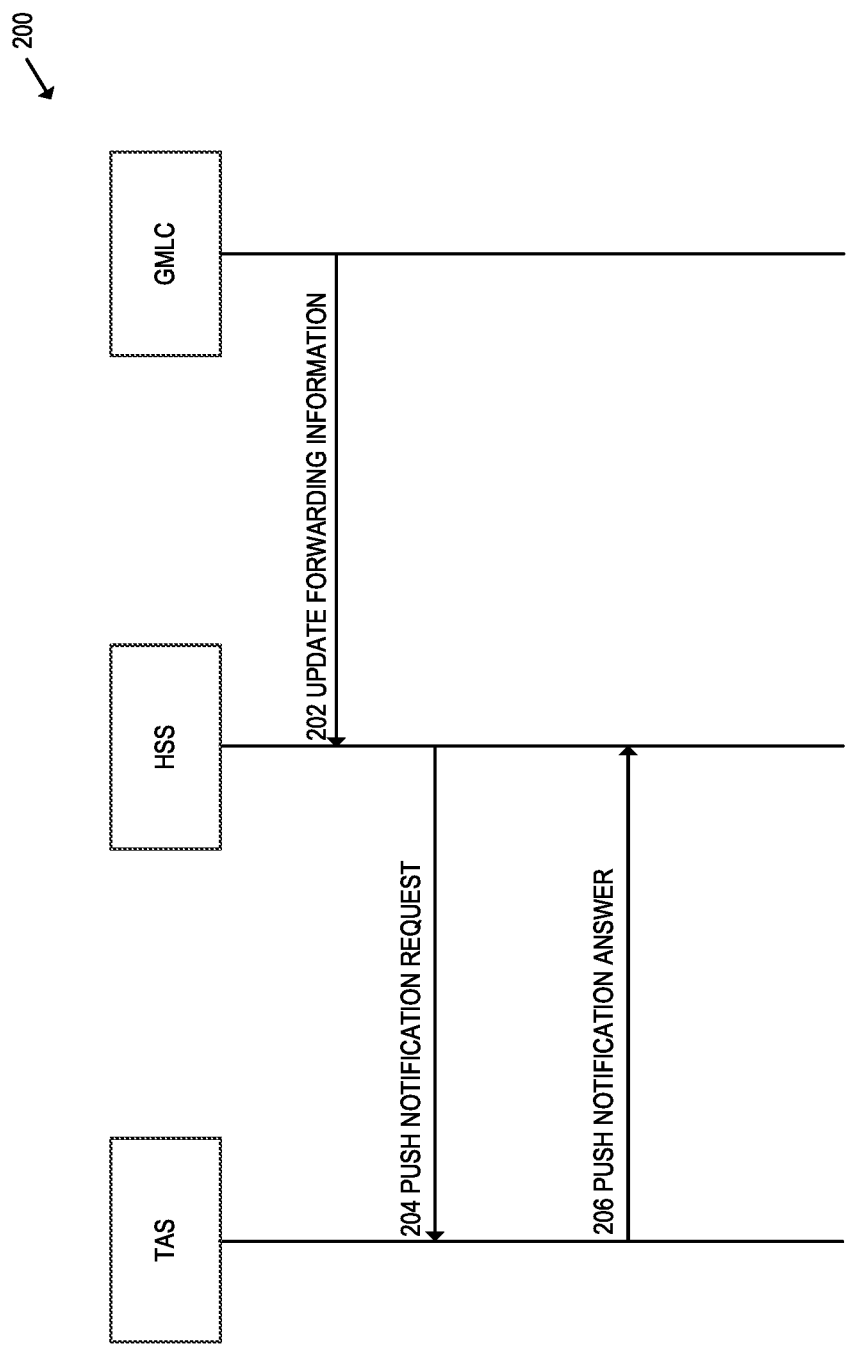
FIG. 2 is a flow diagram that illustrates a process for dynamically updating location-based call forwarding information of a Telephony Application Server (TAS).

FIG. 2 is a flow diagram that illustrates a process 200 for dynamically updating location-based call forwarding information that can be maintained at a TAS. The process 200 commences when a subscriber's location-specific call forwarding information has changed. For example, the user can input or change a new rule or policy for a location-specific call forwarding number. In another implementation, an update procedure is invoked when a change in a current location is detected.

At 202, a GMLC sends updated location-specific call forwarding information to the HSS. At 204, the HSS forwards the updated location-specific call forwarding information in a push notification request to the TAS. At 206, the TAS responds with a push notification answer that indicates that the TAS was successfully updated with the new call forwarding information. As such, the TAS can maintain current subscriber profile information including a new location-specific call forwarding information, which was updated independent of any call forwarding procedure.

Figure 3:
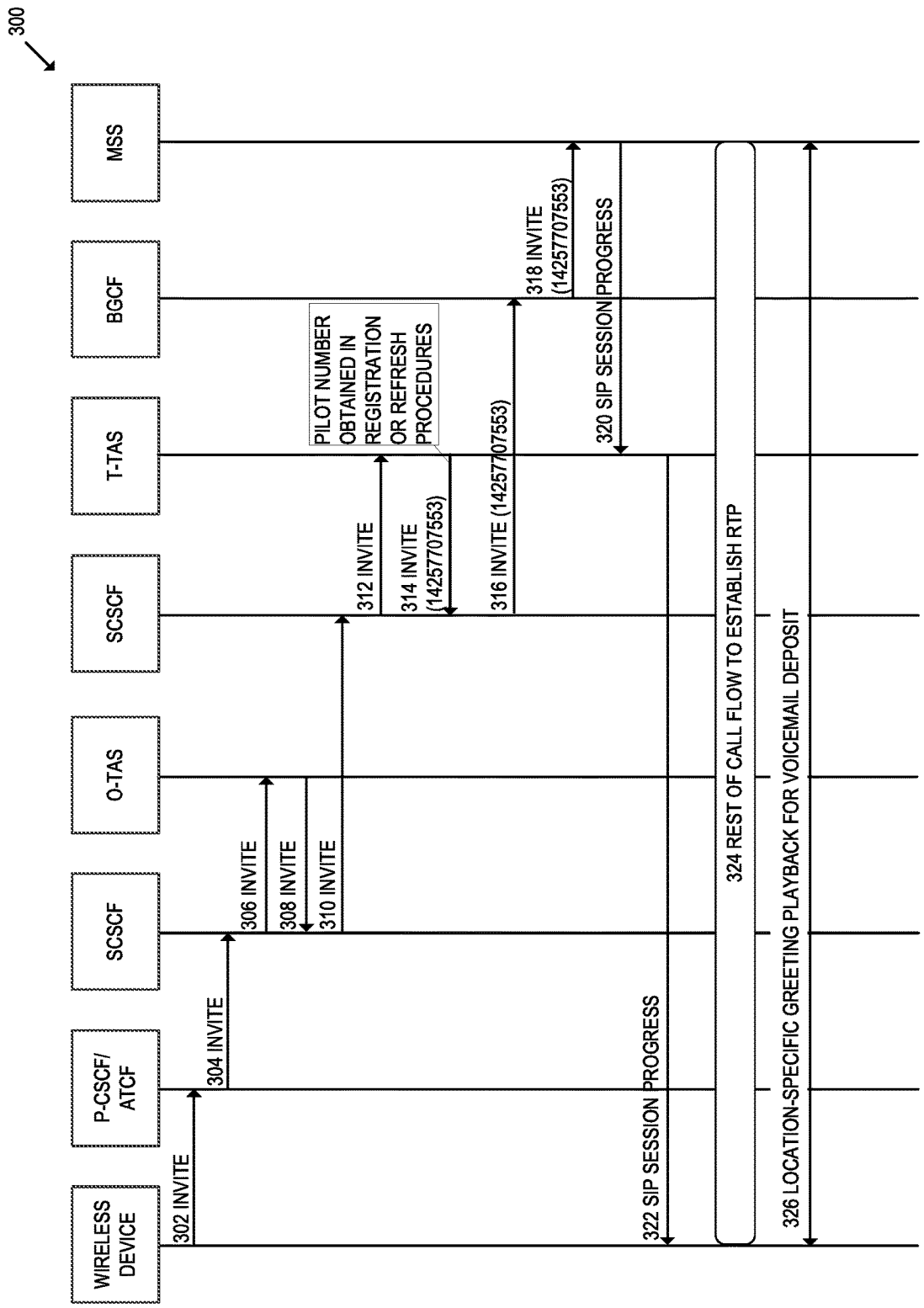
FIG. 3 is a flow diagram that illustrates a process to playback a location-specific voicemail greeting and deposit a voicemail message.

FIG. 3 is a flow diagram that illustrates a process 300 to deposit a voicemail message. Specifically, the process 300 uses a CFU procedure to deposit the voicemail. At 302, the wireless device initiates an INVITE message to the P-CSCF/ATCF. A caller sends this message to request that another endpoint join a SIP session of a call. At 304, the P-CSCF/ATCF sends an INVITE message to the SCSCF. At 306, the SCSF sends an INVITE message to an originating TAS (O-TAS). At 308, the O-TAS responds with an INVITE message to the SCSCF. At 310, an INVITE message is sent to another SCSCF of the terminating wireless device. At 312, an INVITE message is sent from the SCSCF to a terminating-TAS (T-TAS).

At 314, the T-TAS returns an INVITE message with the retrieved location-specific call forwarding information (e.g., pilot number) to route a voicemail message for deposit by a caller. Because the CFU to voicemail is activated, the T-TAS uses the pilot number received during a prior registration procedure to send out an INVITE message with the pilot number. Hence, this eliminates the need for the T-TAS to send a query for the pilot number during the procedure for depositing the voicemail.

At 316, the SCSCF sends an INVITE message by using the retrieved pilot number (e.g., 14257707553) to the breakout gateway control function (BGCF). At 318, the BGCF sends an INVITE message to the mobile switching station (MSS). At 320, the MSS responds by initiating a SIP 183 session progress message to the T-TAS. At 322, a SIP 183 session progress message is communicated from the T-TAS to the UE. At 324, the rest of the call flow occurs to establish an RTP, which is shown in an abbreviated form for the sake of brevity. In 326, the voicemail is deposited to the MSS after a location-specific greeting has played back for the caller.

Figure 4:
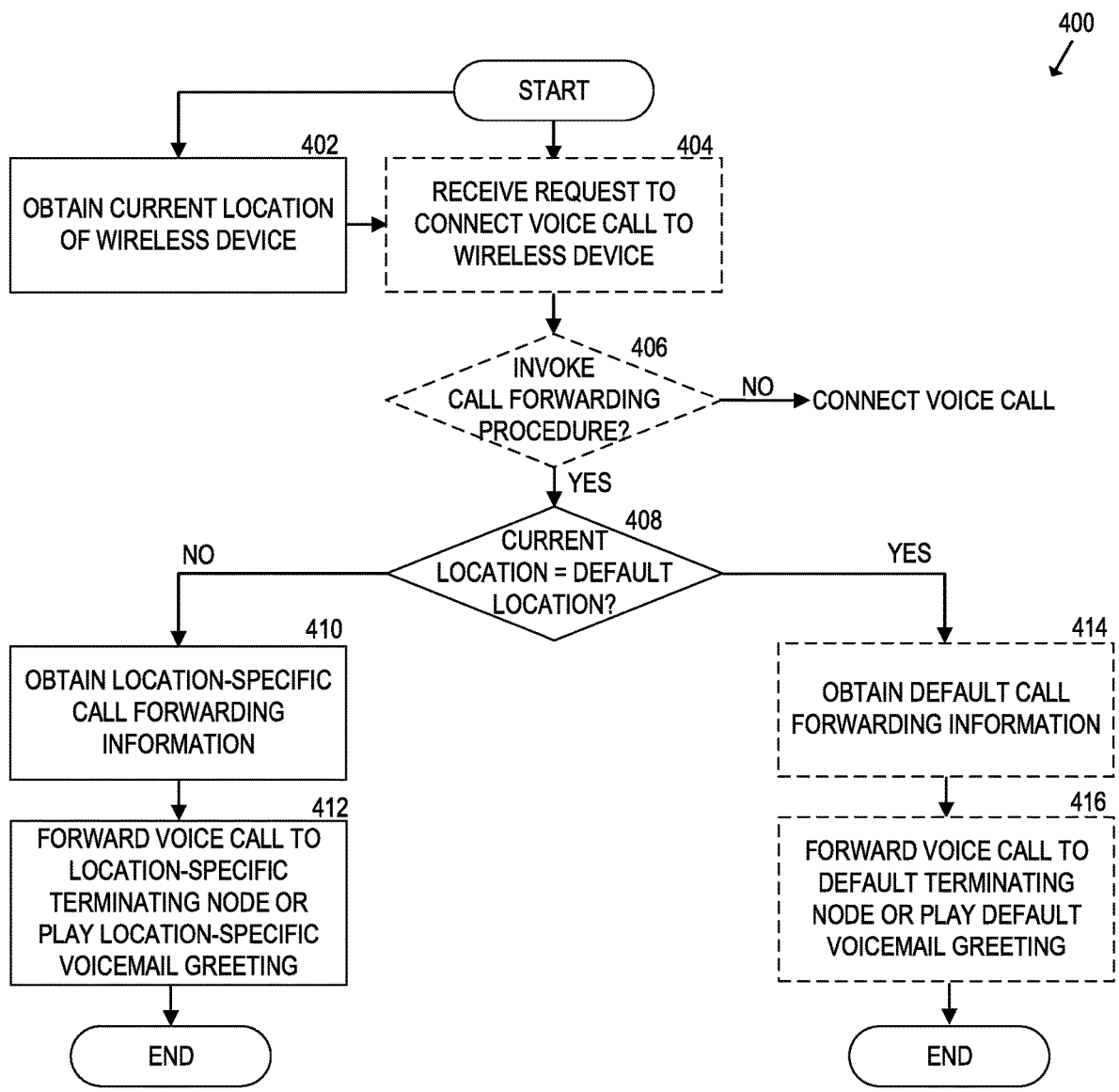
FIG. 4 is a flow diagram that illustrates a process to bifurcate call forwarding based on a location of a wireless device.

FIG. 4 is a flow diagram that illustrates a process 400 to bifurcate call forwarding based on a location of the wireless device. The process 400 can be performed by a telecommunications system ("system") including a TAS, GMLC, and/or other network nodes that perform analogous functions to provide location-specific call forwarding.

At 402, the system obtains location information of a wireless device. The location information includes at least an indication of the current location of the wireless device. The location information can be obtained in response to invoking a call forwarding procedure or from a process that is unrelated to call forwarding. For example, a current location can be obtained from a roaming procedure. In the illustrated example, the current location is obtained from a routine registration process. That is, the current location of the wireless device is obtained when the wireless device registers (e.g., connects) with a wireless telecommunications network. For example, the current location can be obtained from a PANI SIP header during registration. In another example, the current location is obtained during a periodic refresh process for the wireless device, which refreshes the registration with the network periodically. The current location can be stored at the TAS in a subscriber's profile. Because the registration process can be performed irrespective of any request to perform a call forwarding procedure, the system can reduce signaling otherwise required to obtain location information every time callers attempt to connect a voice call to the wireless device.

The system can handle call forwarding procedures in at least two ways depending on whether the location-specific call forwarding information is stored at the TAS before a call forwarding procedure is invoked or the location-specific call forwarding information is retrieved in response to a call forwarding procedure being invoked. The process 400 illustrates both scenarios. Blocks 404 and 406 are omitted when the system updates a subscriber's profile irrespective of whether a caller (e.g., of an originating node) is seeking to connect with the subscriber. Otherwise, the location-specific call forwarding information is obtained only after a caller attempts to connect with the wireless device.

At 404, the system receives a request of an originating node to connect a voice call with the wireless device. The originating node can include a caller using another device to dial a phone number of the wireless device. In an example where the location-specific call forwarding information is not maintained at the TAS, the system must retrieve that information from the network in response to a call forwarding procedure being invoked. Otherwise, the TAS can simply use the locally stored location-specific call forwarding information to perform a call forwarding procedure.

At 406, the system determines whether the recipient of the voice call (subscriber associated with the wireless device) requires performing a call forwarding procedure (e.g., CFNR, CFU, CFB). If the subscriber's profile at the TAS indicates that the subscriber has enabled a call forwarding feature, the system will compare the current location of the wireless device to a default location (e.g., home location) to determine whether location-specific call forwarding information is required. In another example, if the subscriber is unavailable to receive the voice call, the system performs a call forwarding procedure that plays a location-specific voicemail greeting for a voicemail service. On the other hand, if a call forwarding procedure is not invoked, the voice call is established with the wireless device.

At 408, the process 400 bifurcates depending on whether the current location matches the default location. For example, the TAS can determine whether the current location of the wireless device corresponds to the default location or location other than the default location. This can be performed at the TAS by, for example, comparing the current location to the default location stored in the subscriber's profile. The default location can be set by the network based on a subscriber's home address or designated by the subscriber through an app or network portal that allows the subscriber to set the default location, which is then stored on the network side rather than at the wireless device.

At 410, the system determines that the current location of the wireless device is different from the default location. In response, rather than using the default call forwarding information of the HSS, the system uses location-specific call forwarding information of the subscriber at the current location, which is obtained from a GMLC. For example, the GMLC can respond to a request to provide the location-specific information to the HSS, for access by the TAS.

The GMLC can store data mapping the subscriber to location-specific call forwarding information (e.g., call forwarding numbers, voicemail greetings) for different locations. In particular, the GMLC or another functionally similar node stores a registry or database including data tables that map locations of subscribers to call forwarding numbers (e.g., voicemail pilot numbers) and/or voicemail greetings. The data tables can be populated by subscribers using an app on their respective wireless devices. The app can be administered by a network carrier of the telecommunications network. A subscriber can input entries to map their locations with the call forwarding information. In another implementation, the subscriber can set location-specific call forwarding information by using a keypad of the wireless device to navigate a menu administered by the network carrier.

The location-specific call forwarding information is thus stored at the network side so that the network can control the location-specific call forwarding and voicemail greeting features. Moreover, the network can more readily and seamlessly perform the location-specific procedures because the network obtains current location information unrelated to routine processes. This also improves privacy because a subscriber does not have to allow a local app to track the subscriber, and improves performance because the network can directly control call forwarding and voicemail greetings without needing to interact with local apps on the wireless device.

At 412, the system forwards the voice call to a location-specific terminating node associated with the location-specific forwarding number obtained from the network node. The location-specific terminating node is different from the default terminating node. In the case of voicemail, the forwarding information can include a location-specific pilot number to playback of a location-specific voicemail greeting. The forwarding information can alternatively include an indication that is signaled to the voicemail system for playback of a location-specific greeting. The location-specific voicemail greeting can be selected from among multiple location-specific greetings, and each of the multiple location-specific greeting is associated with a different location.

The location-specific voicemail greetings are also input by a subscriber using an app on the wireless device. The location-specific voicemail greetings are stored on the network side by associating the subscriber and one or more pilot numbers with the location-specific voicemail greetings. The system can thus forward voice calls based on a pilot number to cause playback of a location-specific voicemail greeting message for a caller, before depositing a voicemail message at a voicemail server.

At 414, the system determines, instead, that the current location includes the default location of the subscriber. The process 400 then can perform call forwarding procedures for retrieving and using default call forwarding information or playing back a default greeting to a caller. For example, the system can send a request message to the HSS for default call forwarding information including a default call forwarding number. In response, the HSS sends an answer message including the default call forwarding number associated with the default location. Thus, the system does not need to query the GMLC for location-specific forwarding information.

At 416, the system forwards the voice call to the default terminating node of the default forwarding number obtained from the HSS and/or plays back the default voicemail greeting to prompt a caller to deposit a voicemail message.

Although described as a bifurcated process, an implementation can merge the default location and other locations into a single process. For example, the GMLC can store all the call forwarding information (including default information) as location-specific information for each location (including a default location). As such, blocks 414 and 416 can be omitted when location-specific and default information is consolidated at the GMLC.

Although the above examples describe implementations in a particular network environment, the disclosed technology can be implemented in other network environments. For example, an implementation for voice over new radio (VoNR) in 5G could employ the disclosed technology using similar nodes and network elements (e.g., HSS, GMLC, TAS). Hence, the disclosed technique can apply irrespective of access to a 4G or 5G network.

Computer System

Figure 5:
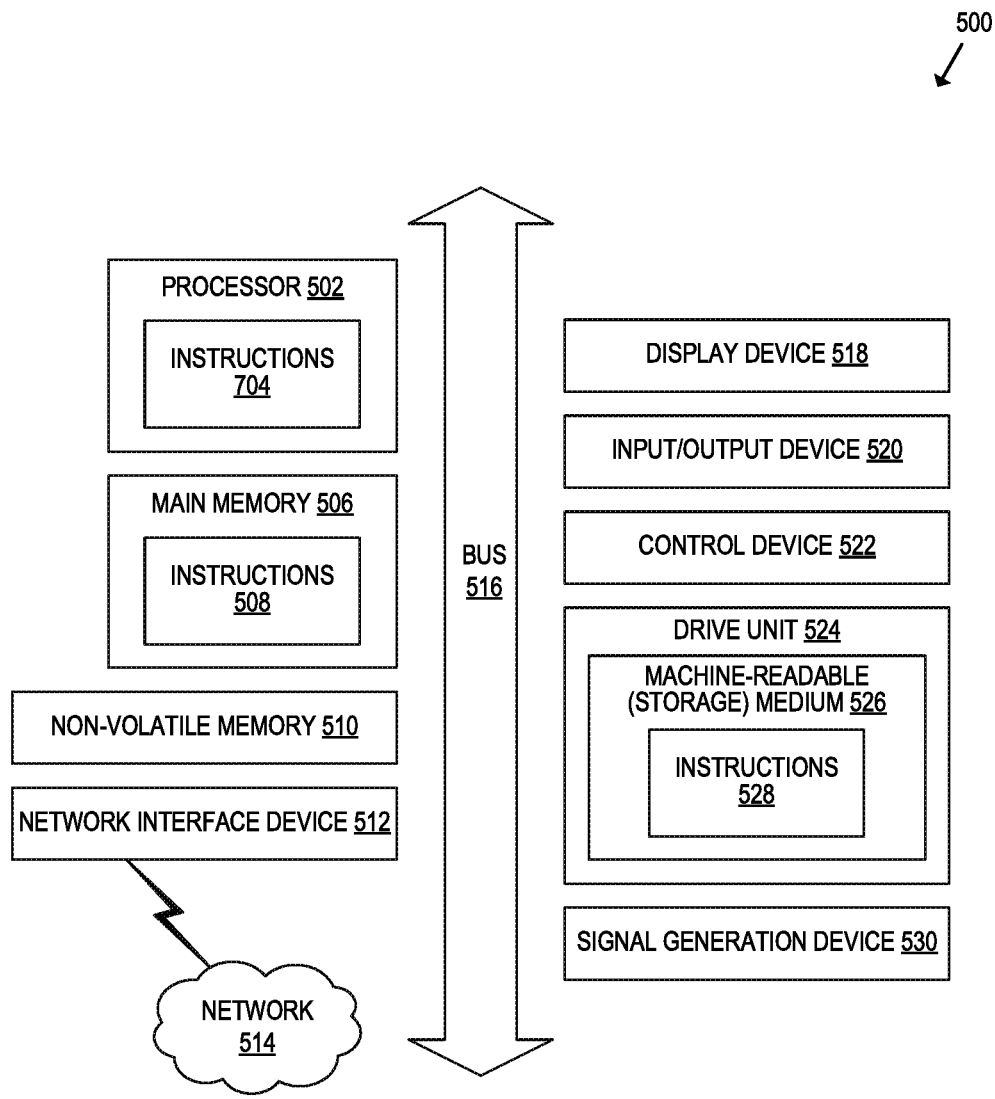
FIG. 5 is a block diagram that illustrates an example of a computing system in which at least some operations described herein can be implemented.

FIG. 5 is a block diagram that illustrates an example of a computer system 500 in which at least some operations described herein can be implemented. For example, components discussed relative to the figures can include or host components of the computing system 500.

As shown, the computer system 500 can include one or more processors 502, main memory 506, non-volatile memory 510, a network interface device 512, video display device 518, an input/output device 520, a control device 522 (e.g., keyboard and point device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. The bus 516 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 5 for brevity. Instead, the computer system 500 is intended to illustrate a hardware device on which components illustrated or described relative to the examples figures and any other components described in this specification can be implemented.

The computer system 500 can take any suitable physical form. For example, the computing system 500 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some embodiment, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The processor 502 can be, for example, a central processing unit, a conventional microprocessor (e.g., Intel Pentium processor). The memory (e.g., main memory 506, non-volatile memory 510, machine-readable medium 526) can be local, remote, or distributed. Although shown as single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. One of skill in the relevant art will recognize that the machine-readable medium 526 can include any type of medium that is accessible by the processor. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

Software is typically stored in the non-volatile memory and/or the drive unit 524. When software is moved to the memory for execution, the processor 502 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 512 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 520 include a keyboard, a mouse or other pointing device, disk drives, printers, a scanner, and other input and/or output devices, including a display device. Examples of the display device 518 can include a cathode ray tube (CRT), liquid crystal display (LCD), or any display device.

In operation, the computer system 500 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, location-specific implementations may perform routines having steps, or employ systems having blocks, in a different order, and some processes or blocks may be deleted, moved, added, subdivided, combined, and/or modified to provide location-specific or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that location-specific implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some location-specific implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium storing instructions, which, when executed by at least one processor, cause a Telephony Application Server (TAS) of a wireless telecommunications network to:
   perform a registration process to register a wireless device with the wireless telecommunications network, wherein a current location of the wireless device is obtained from the registration process;
receive a request of an originating node to connect a voice call from the originating node to the wireless device;
in response to the request to connect the voice call to the wireless device, invoke a call forwarding procedure based on a status of a subscriber associated with the wireless device;
determine that the current location is different from a default location of the subscriber associated with the wireless device;
in response to determining that the current location is different from the default location, send a request message for a network node to obtain location-specific call forwarding information including a location-specific call forwarding number for the subscriber at the current location of the wireless device,
wherein the location-specific call forwarding number is different from a default call forwarding number for the default location;
in response to the request message to the network node, receive an answer message including the location-specific call forwarding number; and
forward the voice call to a terminating node associated with the location-specific call forwarding number obtained from the network node.

2. The at least one non-transitory computer-readable storage medium of claim 1, wherein the TAS is further caused to:
perform a re-registration process to re-register the wireless device with the wireless telecommunications network,
wherein an updated location of the wireless device is obtained from the re-registration process;
receive another request to connect another voice call to the wireless device;
determine that the updated location includes the default location of the subscriber associated with the wireless device;
in response to determining that the updated location includes the default location, send a request message to the Home Subscriber Server (HSS) for the default call forwarding information including the default call forwarding number;
responsive to the request message to the HSS, receive an answer message from the HSS including the default forwarding number for the default location; and
forward the other voice call to a default terminating node associated with the default forwarding number obtained from the HSS.

3. The at least one non-transitory computer-readable storage medium of claim 1, wherein the location-specific call forwarding number is a location-specific pilot number, the location-specific terminating node is a location-specific voicemail server of a voicemail system, and wherein the TAS is further caused to:
cause playback of a location-specific voicemail greeting for the originating node,
wherein the location-specific voicemail greeting is different from a default voicemail greeting for the default location.

4. The at least one non-transitory computer-readable storage medium of claim 1, wherein the network node includes a Gateway Mobile Location Centre (GMLC) that stores a registry including a mapping of the subscriber to different locations associated with respective location-specific call forwarding numbers,
wherein each location-specific call forwarding number enables a call forwarding procedure for a specific location in which the wireless device is connected to the wireless telecommunications network.

5. The at least one non-transitory computer-readable storage medium of claim 1, wherein the current location of the wireless device is pulled from a p-Access Network Info (PANI) SIP header during the registration process.

6. The at least one non-transitory computer-readable storage medium of claim 1, wherein the registration process is performed irrespective of any call forwarding procedure for the wireless device.

7. The at least one non-transitory computer-readable storage medium of claim 1, wherein the registration process is part of a refresh process to periodically re-register the wireless device with a wireless telecommunications network.

8. A method performed by one or more network nodes of a wireless telecommunications network to forward a voice call for a wireless device to a terminating node based on a current location of the wireless device, the method comprising:
receiving a request of an originating node to connect the voice call to the wireless device;
in response to the request to connect the voice call to the wireless device, invoking a call forwarding procedure based on a status of a subscriber associated with the wireless device;
determining that a current location of the wireless device is different from a default location of the subscriber associated with the wireless device;
in response to determining that the current location is different from the default location, send a request message for a network node to obtain a location-specific call forwarding information including a location-specific call forwarding number associated with the subscriber at the current location of the wireless device,
wherein the location-specific call forwarding information is different from a default call forwarding information associated with the default location for the subscriber;
in response to the request message, receiving an answer message including the location-specific call forwarding number associated with the subscriber at the current location of the wireless device; and
forwarding the voice call to a location-specific terminating node associated with the location-specific call forwarding number obtained from the network node.

9. The method of claim 8 further comprising, prior to receiving the answer message:
requesting the location-specific call forwarding information in lieu of requesting the default call forwarding information at a Home Subscriber Server (HSS).

10. The method of claim 8 further comprising, prior to receiving the request to connect the voice call to the wireless device:
performing a registration process for the wireless device to register with the wireless telecommunications network,
wherein the current location is obtained from the registration process.

11. The method of claim 8 further comprising, prior to receiving the request to connect the voice call to the wireless device:

performing a refresh process to periodically refresh registration with the wireless telecommunications network,
  wherein the current location is obtained from the refresh process.

12. The method of claim 8 further comprising:
receiving an indication of an updated location of the wireless device;
receiving another request to connect another voice call to the wireless device;
determining that the updated location includes the default location;
obtaining a default call forwarding number from a Home Subscriber Server (HSS); and
forwarding the other voice call to a default terminating node associated with the default call forwarding number obtained from the HSS.

13. The method of claim 8, wherein the location-specific forwarding number is a location-specific pilot number, the method further comprising:
causing playback of a location-specific voicemail greeting for the originating node,
  wherein the location-specific voicemail greeting is different from a default voicemail greeting for the default location.

14. The method of claim 8, wherein the network node stores a database including a mapping of the subscriber to different locations associated with respective location-specific call forwarding numbers,
  wherein each location-specific call forwarding number enables a call forwarding procedure for a specific location in which the wireless device connected to the telecommunications wireless network.

15. A system of a wireless telecommunications network, the system comprising:
a processor; and
a memory coupled to the processor, wherein the memory stores instructions which, when executed by the processor, cause the system to:
  receive an indication that an originating node seeks to deposit a voicemail message for a terminating node,
    wherein the terminating node is associated with a wireless device of a subscriber of the wireless telecommunications network;
  determine that a current location of the wireless device is different from a default location of the subscriber associated with the wireless device; and,
  in response to determining that the current location is different from the default location, cause playback of a location-specific voicemail greeting for the originating node,
    wherein the location-specific voicemail greeting is different from a default voicemail greeting for the default location.

16. The system of claim 15, wherein causing playback of the location-specific voicemail greeting further comprises causing the system to:
request a location-specific pilot number stored at a Gateway Mobile Location Centre (GMLC).

17. The system of claim 15 further caused to, prior to receiving the indication that the originating node seeks to deposit the voicemail message for the terminating node:
retrieve a location-specific pilot number stored at a Telephony Application Server (TAS),
  wherein the location-specific pilot number enabling routing the voice call to play back the location-specific voicemail greeting.

18. The system of claim 15, further caused to, prior to receiving the indication that the originating node seeks to deposit the voicemail message for the terminating node:
obtain the current location of the wireless device from a registration process in which the wireless device registers with the wireless telecommunications network.

19. The system of claim 15, wherein the location-specific voicemail greeting is set for the current location based on input from the subscriber to the wireless device, and wherein the location-specific voicemail greeting is stored at the network in association with the subscriber and a pilot number for a voicemail service.

20. The system of claim 15 further caused to, prior to retrieving the location-specific voicemail greeting:
perform a refresh process to periodically re-register the wireless device with the wireless telecommunications network,
  wherein the current location is obtained from the refresh process.

* * * * *